July 7, 1959 C. E. TATE ET AL 2,894,122
TRANSCEIVER WITH AUTOMATIC BIAS CONTROL OF MODULATOR
Filed Sept. 12, 1955
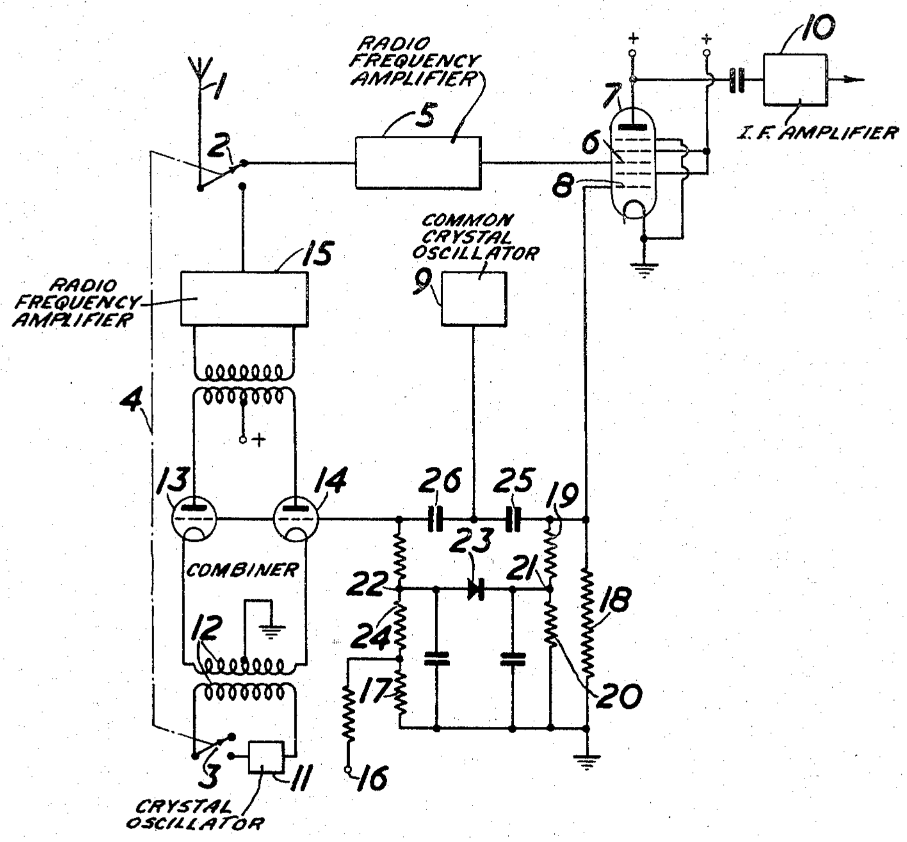
INVENTORS:
Clifford Edward Tate and
Peter John Gordon Freeman
BY: Baldwin & Wight
ATTORNEYS

United States Patent Office 2,894,122

Patented July 7, 1959

2,894,122

TRANSCEIVER WITH AUTOMATIC BIAS CONTROL OF MODULATOR

Clifford Edward Tate and Peter John Gordon Freeman, Chelmsford, England, assignors to Marconi's Wireless Telegraph Company Limited, London, England, a British company Application September 12, 1955, Serial No. 533,665

Claims priority, application Great Britain July 13, 1955

5 Claims. (Cl. 250—13)

This invention relates to radio and like transmitters and more particularly to transmitters of the kind in which a frequency to be transmitted is obtained by mixing two locally generated frequencies in a mixer or modulator.

Transmitters of the kind referred to are used inter alia in transmitter-receiver installations in which a common crystal controlled local oscillator is used both for beating a received radio frequency to the intermediate frequency of the receiver and also for beating locally generated oscillations of said intermediate frequency to said radio frequency for transmission. Transmitter-receiver installations of this nature may be termed "common frequency working, common crystal oscillator, transmitter-receivers." Although, in the preceding description, only a single crystal has been referred to as employed in the common crystal oscillator, it is to be understood that in practice the said oscillator would normally be equipped with a large number of selectable crystals of different frequency to enable the transmitter-receiver to select any of a large number of different frequencies on which to transmit and receive. Thus the local oscillator crystals are "common" in the sense that each crystal is used both for transmission and reception.

An important practical requirement with transmitters of the kind referred to, and notably in common frequency working, common crystal oscillator transmitter-receivers, is that of avoiding spurious undesired frequency output components from the mixer or modulator in which the two local frequencies are mixed to produce the required transmitted frequency. The satisfaction of this requirement involves that the said mixer or modulator shall always operate over the very limited substantially linear portion of its characteristic. In practice, however, the output amplitude from the common crystal oscillator is not by any means always of substantially the same value. Thus, for example, when one transmitted frequency is chosen the common crystal oscillator may provide its output to the mixer directly from a crystal controlled oscillator valve in said oscillator but for another frequency the said output may be obtained via a frequency multiplier which multiplies the oscillator actually produced by a crystal controlled oscillator valve. In the one case, therefore, the output amplitude to the mixer may be much greater than in the other. Again the amplitude produced by the crystal oscillator valve itself may be considerably greater when one of the selectable crystals is in circuit than when another is chosen. Such variations of the amplitude of one of the two inputs to the mixer or modulator may cause the working point therof to be moved well off the limited linear portion of the characteristic with consequent objectionable distortion and spurious frequency effects. The object of the present invention is to avoid this defect in a simple and reliable manner involving the minimum of additional apparatus.

According to this invention a radio transmitter of the kind in which a transmitted frequency is derived by mixing or beating together two locally generated frequencies in a mixer or modulator or a combiner, provided with means for controlling the operating point of said mixer or modulator or combiner in dependence upon the amplitude of one of the said two frequencies so as automatically to maintain said operating point on the substantially linear portion of the characteristic of said mixer or modulator or combiner.

Preferably said controlling means include means for producing a D.C. voltage dependent upon said amplitude and utilizing said voltage as bias for said mixer or modulator or combiner.

Preferably also, where the invention is applied to a common frequency working common crystal oscillator transmitter-receiver, said D.C. voltage dependent upon said amplitude is derived from a resistance connected in the local oscillator input grid circuit of the normally provided frequency changer of the receiver portion of the apparatus. In this way the required D.C. potential is obtained without having to provide any additional rectifier therefor. Preferably in this embodiment of the invention there is provided a fixed bias in addition to the amplitude dependent bias and the two bias potentials are combined by means of a circuit including a unidirectional conductor whereby when the amplitude dependent bias potential exceeds the fixed bias potential the former becomes effective, the latter thus constituting a minimum bias.

The invention is illustrated in the accompanying diagrammatic drawing which shows, so far as is necessary to an understanding of the said invention, a common frequency working common crystal oscillator transmitter-receiver embodying the same.

Referring to the drawing 1 is in aerial which is used both for transmission and reception and 2 is a change over switch whereby the transmitter-receiver may be changed over from reception to transmission and vice versa. The switch 2 is gang controlled with a switch 3 as indicated by the chain line 4 and when the switches 2, 3 are in the positions shown in the drawing the apparatus is adapted for reception. With the switches 2, 3 as shown signals received upon the aerial 1 are amplified in a radio frequency amplifier 5 and fed to the signal input grid 6 of a frequency changer valve 7 shown as a heptode. The second or local oscillator input to the valve 7 is applied to the grid 8 and is derived via condenser 25 from a crystal controlled local oscillator represented by the block 9. It is to be understood that the oscillator 9 will in practice embody a large number of selectable crystals of different frequencies and may also embody frequency multipliers, harmonic selectors and/or other frequency changers whereby a number of frequencies exceeding the number of crystals provided may be obtained. All this is well known practice and requires no further description here. The intermediate frequency output from the frequency changer valve 7 is amplified in an intermediate frequency amplifier 10 and utilized in any well known required manner by apparatus not shown.

When the apparatus is required to be used for transmission the switches 2, 3 are changed over to their other positions. Closing of switch 3 connects an oscillator 11 which is crystal controlled to produce the same frequency as is employed in the intermediate frequency amplifier 10, across the primary of a transformer 12, the ends of whose divided secondary are connected to the cathodes of a mixer or modulator, hereinafter more particularly referred to as a combiner, consisting of two valves 13, 14, shown as triodes, and connected in a well known balanced modulator circuit. The second input to the balanced modulator is derived from the local oscillator 9 via condenser 26. Output of radio frequency determined by the combination of the two inputs to the balanced modulator is amplified in a radio frequency amplifier 15 and transmitted from the aerial 1. It will be seen that with any given selected frequency of the oscillator 9 the apparatus will receive or transmit on the same common radio frequency in dependence on the position of the switches 2, 3.

With the apparatus as so far described there is the defect that at different frequency settings of the oscillator 9 the output amplitude therefrom may be widely different with the result that at certain of these settings the balanced modulator or combiner 13, 14 may be taken beyond the very limited linear portion of its characteristic and thus produce distortion and spurious output frequencies. In order to avoid this defect the bias on the balanced modulator is automatically controlled so that, despite changes in the amplitude from oscillator 9, the said modulator always operates correctly within the linear portion of its characteristic. The bias applied to the valves 13, 14 includes a fixed component which is applied at terminal 16, the potential applied at this point determining the minimum bias which can be applied to the modulator. This minimum bias is built up across the resistance 17. In circuit with the local oscillation input grid 8 of the receiver frequency changer 7 is a resistance 18 across which are two resistances 19, 20 in series. The ratio of the resistances 19, 20 is so chosen that the potential at their junction point 21 equals the potential at the point 22 due to the fixed bias source when the amplitude of the oscillations from the source 9 is of such value that the said potential at the point 22 biasses the valves 13, 14 substantially to the middle of the linear portion of the characteristic. The points 22 and 21 are connected by a diode or other uni-directional conductor 23. It will be seen, therefore, that if the amplitude from the oscillator 9 increases beyond that just mentioned the automatic bias component produced at point 21 exceeds the constant bias produced at point 22. The diode 23 then conducts and the bias on the valves 13, 14 increases as necessary to maintain the said valves operating over the linear portion of the characteristic despite the increase in local oscillation amplitude. The resistance 24 between the resistance 17 and the point 22 is made much greater than either the said resistance 17 or the resistance 19. With correct choice of the values of the resistances in the circuit the working point of the balanced modulator may be maintained correct within comparatively close limits despite wide variations in the input amplitude from the oscillator 9. The coupling condensers 25, 26 are chosen of such magnitudes that the amplitude from the local oscillator 9 provided at the grids of the valves 13, 14 is considerably less than that available at the local oscillation input grid 8 of the frequency changer valve 7 so that a sufficient "automatic" bias component is always available for producing the result required.

We claim:

1. A radio transmitter of the kind in which a transmitted frequency is derived by combining oscillations of two locally generated radio frequencies in a combiner comprising a pair of balanced valves each including at least a cathode, a control grid and an anode, said transmitter including rectifier means for deriving a bias voltage for said control grids of said combiner from one of said two locally generated radio frequencies for applying the derived bias to the grids of said combiner, a resistance bridge connected with said rectifier means and including two balanced resistance portions, one resistance portion constituted by two resistors connected in series through a junction point, and the other resistance portion including other resistors connected in a series circuit with a tap therebetween, a fixed bias source connected to one of the resistors in said last mentioned series circuit, the ratio of said resistors in the first mentioned resistance portion of said bridge being such that the potential at said junction point equals the potential at the tap between the other resistors in said second mentioned resistance portion when the amplitude of the oscillations of said one of said two locally generated radio frequencies is of such value that the potential at said tap biases the grids of said combiner substantially to the middle of the linear portion of the characteristic of said valves.

2. A radio transmitter as set forth in claim 1 in which said rectifier means is constituted by a diode connected between the resistance portions of said bridge.

3. A radio transmitter as set forth in claim 1 in which said rectifier means is constituted by a unidirectional conductor connected between the resistance portions of said bridge.

4. A radio transmitter as set forth in claim 1 in which said first mentioned resistance portion constituted by said two resistors connected in series to a junction point are shunted by a resistance constituting the input circuit to a receiver coacting with said radio transmitter.

5. A radio transmitter-receiver of the kind in which a transmitted frequency is derived by combining two locally generated radio frequencies in a combiner, a transmitter-receiver including a local oscillator, one of said frequencies being generated by said local oscillator for the receiver, said transmitter-receiver including a fixed grid bias source for said combiner, means for deriving a bias voltage for said combiner from said local oscillator, means to balance said fixed grid bias with the derived bias voltage, means for applying the resultant bias to said combiner automatically to maintain the operating point of the combiner on the substantially linear portion of the characteristic of said combiner, rectifier means for producing a direct current voltage dependent upon amplitude of the frequencies generated by said local oscillator, a bridge circuit having a resistance in one portion thereof connected with said rectifier means and wherein said rectifier means produces a direct current voltage dependent upon amplitude of the locally generated oscillations, said oscillations being applied to the resistance in one portion of said bridge circuit, and means for applying a fixed voltage to said bridge circuit to balance the bias provided by said rectifier means at a predetermined voltage.

References Cited in the file of this patent

UNITED STATES PATENTS

| | | |
|---|---|---|
| 1,724,668 | Kummerer | Aug. 13, 1929 |
| 2,041,951 | Plebanski | May 26, 1936 |
| 2,143,864 | Conklin et al. | Jan. 17, 1939 |
| 2,167,511 | Hornung | July 25, 1939 |
| 2,227,505 | Kummerer | Jan. 7, 1941 |
| 2,250,571 | Buschbeck | July 29, 1941 |